(12) United States Patent
Boughorbel (10) Patent No.: US 8,326,025 B2
(45) Date of Patent: Dec. 4, 2012

(54) METHOD FOR DETERMINING A DEPTH MAP FROM IMAGES, DEVICE FOR DETERMINING A DEPTH MAP

(75) Inventor: Faycal Boughorbel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 945 days.

(21) Appl. No.: 12/439,691

(22) PCT Filed: Sep. 4, 2007

(86) PCT No.: PCT/IB2007/053550
§ 371 (c)(1),
(2), (4) Date: Mar. 3, 2009

(87) PCT Pub. No.: WO2008/029345
PCT Pub. Date: Mar. 13, 2008

(65) Prior Publication Data
US 2009/0324059 A1    Dec. 31, 2009

(30) Foreign Application Priority Data

Sep. 4, 2006  (EP) .................................... 06120051

(51) Int. Cl.
*G06K 9/00*  (2006.01)

(52) U.S. Cl. ....................................................... 382/154

(58) Field of Classification Search .................. None
See application file for complete search history.

(56) References Cited

FOREIGN PATENT DOCUMENTS
EP      148766 A2     5/2004

OTHER PUBLICATIONS

Boughorbel F.: "Multiple footprint stereo algorithms for 3D display content generation" Proceedings of SPIE, vol. 6490, Mar. 5, 2007, XP002466221.
Boughorbel, F.: "A New Multiple-Windows Depth from Stereo Algorithm for 3D Displays" 3DTV Conference 2007, May 7-9, 2007, pp. 1-4, XP002466410.
Geiger D et al: "Occlusions and Binocular Stereo" International Journal of Computer Vision, Kluwer Academic Publishers, Norwell, US, vol. 14, No. 3, Apr. 1, 1995, pp. 211-226, XP000495842 ISSN: 0920-5691.
Hoff W et al: "Surfaces From Stereo: Integrating Feature Matching, Disparity Estimation, and Contour Detection" IEEE Transactions on Pattern Analysis and Machine Intelligence, IEEE Service Center, Los Alamitos, CA, US, vol. 11, No. 2, Feb. 1, 1989, pp. 121-136, XP000099284 ISSN: 0162-8828.
Masatoshi Okutomi, et al: A Simple Stereo Algorithm to Recover Precise Object Boundaries and Smooth Surfaces, Computer Vision and Pattern Recognition 2001, CVPR 2001, Proceedings of the 2001 IEEE Computer Society Conference on vol. 2, 2001, pp. II-138-II-142.

*Primary Examiner* — Chan S Park
*Assistant Examiner* — Elisa Rice (57) ABSTRACT

Window based matching is used to determine a depth map from images obtained from different orientations. A set of matching windows is used for points of the image for which the depth is to be determined. A provisional depth map is generated wherein to each point more than one candidate disparity value is attributed. The provisional depth map is filtered by a surface filtering wherein at least the z-component of a norm of a sum of unit vectors pointing from the candidate disparity values for neighboring points to a point of interest.

18 Claims, 10 Drawing Sheets

METHOD FOR DETERMINING A DEPTH MAP FROM IMAGES, DEVICE FOR DETERMINING A DEPTH MAP

FIELD OF THE INVENTION

The invention relates to a method for determining a depth map from images obtained from different orientations using window-based matching for a point of the image. The invention also relates to a device for determining a depth map from images obtained from different orientations using window-based matching for a point of the image.

DESCRIPTION OF PRIOR ART

For a number of applications it is desirable to determine a depth map from images. Examples of such applications include systems that make it possible to compute images of the scene viewed from interactively controllable orientations, image compression, inspection etc. The task of recovering depth maps from stereo imagery is often crucial for a wide range of applications such as 3D displays, quality control at manufacturing, autonomous navigation and object recognition. Herein, depth of a point in an image refers to the distance between the viewpoint and the plane through the point and perpendicular to the optical axis of camera.

When the viewpoint of a camera is moved from a first to a second viewpoint, a depth of an image point can be determined from the amount of translation of the position of the image point. If the image is obtained by point projection, the translation is proportional to the amount of displacement of the camera and inversely proportional to the depth of the part of an image.

It has been known, in order to measure the translation, to use window based matching wherein the pixel values in a window around a pixel in a first image obtained from a first orientation of the camera are compared to the pixel values in a window around a pixel in a second image obtained from a second orientation. Matching usually involves determining an aggregate of the differences between the pixel values of the pixels in the matching windows.

It has also been proposed to use adaptive windows. Using adaptive windows, however, requires a, usually quite complicated, algorithm to adapt the windows.

A method for determining a depth map using window-based matching is described in the article "A Simple Stereo Algorithm to Recover Precise Object Boundaries and Smooth Surfaces" by Masatoshi Okutomi et al in Computer Vision and Pattern Recognition 2001, CVPR 2001, Proceedings of the 2001 IEEE Computer Society Conference on Volume 2, 2001, pages II-138 to II-142, vol. 2.

In the known method for each point of the image for which matching is performed a matching window is used wherein the position of the point of interest is scanned over all points of the window. If a matching window is set asymmetrically around a pixel of interest so that the matching window does not to cover the object boundary, boundary overreach does not appear. The pixel of interest is scanned over the total set of matching windows. Finding the minimum value of the resultant SSSD (Sum of SSD, where SSD is the Sum of Squared differences) gives the disparity estimate for the point.

The known method provides for a solution for the boundary overreach problem. The solution comes, however, at the cost of the need for a large number of computations. Furthermore, another problem occurs: smooth disparity surfaces are destroyed and many stepwise squares are observed in such smooth disparity surfaces. The problems in smooth disparity surfaces are countered in the known method by implementing a boundary detection method and processing the boundary regions differently from the non-boundary regions.

However, the known method requires a large amount of computing power and a rather complex algorithm.

Amongst others, it is an object of the invention to provide a method which requires relatively less computing power while yet providing relatively reliable and accurate estimates of the depth.

SUMMARY OF THE INVENTION

According to the invention, at least for a part of the image, for the points of the part of the image a set of matching windows is used, a number of candidate disparity values is calculated for each point to provide for a provisional depth map wherein to each point more than one candidate disparity value is attributed, where after a further depth map is calculated by minimizing for each point at least the z-component of a norm of a sum of unit vectors pointing from the candidate disparity values for neighboring points to said point.

The known method is based on a 'winner-takes-all' strategy, i.e. for each point a single best disparity value is calculated. This requires a high accuracy, which requires large amounts of computing power. Even so, the accuracy is only as good as the particular choice of matching windows, i.e. if a particular problem is associated with the choice of matching windows, the problem will persist.

In the present invention a different approach is taken. For each point several candidate disparity values are initially calculated using a set of matching windows.

The inventor has realized that for window-based techniques the proper selection of the windows is important. If the size of the matching window employed is large this may result in blurred depth maps with inaccurate boundaries and a loss of fine details. Using smaller windows on the other hand, while reducing calculating power and being good, could lead to a method prone to noise. The result of matching with relatively small windows will be noisy depth maps but containing important small image features. Instead of common approaches to multi-window matching that select as the disparity values for a point of interest the result of the window with the lowest SSD or SAD score, the key feature of the method in accordance with the invention is a re-calculation of disparity estimates using the candidates as a regularizing space. A noisy provisional depth map is made where for each point several candidate disparity values are calculated. For such calculation only a limited calculating power is needed. A smoothing operation is thereafter performed to provide each point with a z-value.

Taking the average or the median of the candidate disparity values to find the 'true disparity values', has turned out not to give promising results. However, using unit vectors for re-calculation the further depth map has turned out to provide good results. The further depth map, herein below sometimes also called the local depth map, is calculated by computing the unit vectors pointing from neighboring 3D points (within the neighborhood and coming from the different super-imposed multi-candidate datasets) to a point, and then finding the disparity that minimizes at said point at least the z-component of a norm of a sum of these unit vectors. This is done for each point of the part of the surface. "Each point" refers to the point of the part of the image for which a further depth map is to be made. The number of points within the calculation for the part of the image will usually be equivalent to the number of pixels, wherein to each pixel a point is attributed. "Each point" is not to be misconstrued as to mean 'each point' in a mathematical sense for which there are an infinite number. Neighboring means within the concept of the invention within a given range around the point of interest.

In preferred embodiments a norm of the sum of the unit vectors is minimized. If the interest lies mainly in recovering fronto-parallel surfaces minimizing only the z-component of the norm of the sum of unit vectors could be an adequate procedure.

In more sophisticated methods all components of the norm of a sum of the unit vectors of neighboring points are minimized.

Preferably the sum of the unit vectors is a weighted sum, wherein the weight for each unit vectors within the calculation is a function of distance to the point of interest. This will improve the accuracy. The disparity value of a point of interest is more likely to be similar to the disparity value of near-neighboring points than to points further away from the point of interest.

Preferably the set of matching comprises one or more matching windows for which the point of interest is eccentrically located in respect of the matching window. While square blocks are the most commonly used shapes for matching windows, eccentrically positioned shapes for matching windows are more suitable for locking on particular image features such us horizontal and vertical edges. The fact that they are not centered at the point of interest in the image allows at least one of the windows to properly match near occluding boundaries.

Preferably a check is performed to delete from the calculation unit vectors, which differ more than a threshold value from the average. Aberrant candidate disparity values, i.e. candidate disparity values far outside the normal range due to some computational error, are then less likely to negatively influence the outcome. The threshold values may be a fixed value or be calculated on the basis of the other values or may be related to a spread calculation.

Preferably the set of matching windows is a substantially orthogonal set of matching windows. Substantially orthogonal matching windows are matching windows wherein the overlap in pixels between the windows is less than ¼ of the number of pixels per window.

In preferred embodiments the number of matching windows is four and the matching windows form a cross. A cross is a simple arrangement, which has shown to give good results.

In another preferred embodiment the number of matching windows is eight, wherein the windows are comprised of two foursomes, one foursome being the left hand or right hand version of the windows in the other foursome, each forming a cross. Using one foursome of matching windows may introduce a slight left to right or right to left bias. By using two foursomes this bias can be eliminated.
In another embodiment the matching windows are substantially triangular.

BRIEF DESCRIPTION OF THE DRAWINGS

These and other advantageous aspects of the invention will be described in more detail using the following Figures.

The Figures are not drawn to scale. Generally, identical components are denoted by the same reference numerals in the Figures.

DETAILED DESCRIPTION OF PREFERRED EMBODIMENTS

Figure 1:
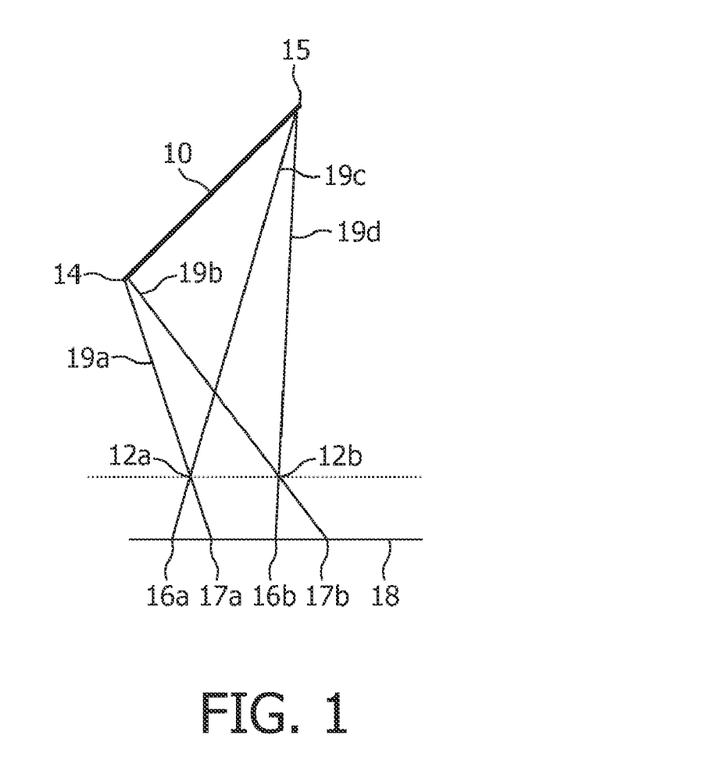
FIG. 1 shows the geometry of part of an image and two orientations

FIG. 1 shows the geometry of a part of an image 10 and two orientations 12a,b. A part of an image may be for instance a person, or any object within the image. The present invention relates to a method for providing a depth map for an image. A depth map can be seen as attributing a z-value, i.e. a depth value, to points of objects. When images of a scene containing the part of an image 10 are obtained using point projection from different orientations 12a,b, the position where points 14, 15 on the part of an image will be visible in the image are projections 16a,b, 17a,b of points 14, 15. The projections can be illustrated by drawing lines 19a-d from the points 14, 15 through the orientations 12a,b to an image plane 18. For setting out the basic principles, the orientations 12a,b have been selected in a plane parallel to the image plane 18, but the invention is not limited to such a selection of orientations 12a,b. The intersections between these lines 19a-d and the image plane 18 illustrate the positions where the points 14, 15 of the part of an image 10 will be visible in images.

It will be noted that a change of viewpoint 12a,b results in a translation of the position 16a,b 17a,b where a point 14, 15 on the part of an image will be visible in the image plane 18. This translation is inversely proportional to the depth "z" between the viewpoint and the point and proportional to the amount of change in the position of the viewpoint. As a result, the translation will be different for points 14, 15 of the part of an image 10 that have different depths "z" from the orientations 12a, b.

Figure 2:
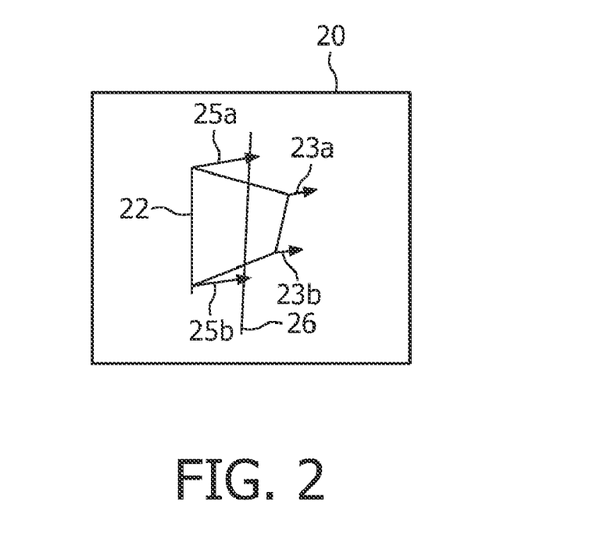
FIG. 2 shows an image of a part of an image

FIG. 2 shows an image 20 containing a region 22 where a part of an image is visible. In the image 20 translation vectors 23a,b, 25a,b are shown by which the positions where points of the part of an image that are visible in the image 20 will be translated in response to a movement of the viewpoint. It will be noted that the translation vectors 25a,b will be larger for points of the part of an image that are closer to the viewpoint than for points that are further from the viewpoint. Along a line 26 where the depth of all points is the same, the translations will be the same.

When one uses a coordinate system having an axis along the line 26 and an axis perpendicular to that line, the amplitude of translation "D" of the position where a point is visible will be proportional to A+Bu, where u is a coordinate of the position where the point is visible along the axis perpendicular to the line 26. The direction of translation is opposite to the direction of movement of the viewpoint. The parameter "A" is proportional to the inverse of the depth "Z0" at u=0: A=c/Z0 and "B" is similarly proportional to that depth and the slope "s" of the part of an image perpendicular to the direction of viewing: B=c*s/Z0 (c is a proportionality constant proportional to the displacement of the viewpoint, the focus distance and the scale of the image). The FIGS. 1 and 2 illustrate a situation wherein two cameras are used. To determine a depth map more than two cameras may be used. Using more than two cameras increases the accuracy and reduces the chance that background objects are occluded by objects in the foreground.

Figure 3A:
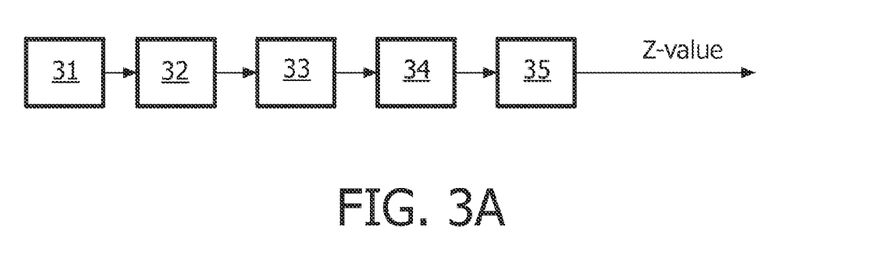
FIG. 3A shows a flow-chart of a method for making a depth map.

FIG. 3A schematically shows a flow-chart of a part of a method for making a depth map for an image or at least for a part of an image.

In a first and second step 31, 32 of the flow chart the camera optics are positioned at a first and second viewpoint respectively, from which a first and second image is obtained respectively.

In a third step 33 of the flow chart a pixel in the first image is selected. In a fourth step 34 for the pixel a match is found between the images using matching windows.

In step 35 of the flow chart to said pixel a z-value is attributed using the results of step 34, i.e. the match of the windows. In known methods to each pixel a single 'best' z-value is attributed according to the winner-takes-all principle, i.e. the best match is sought and this establishes the disparity value (=z-value). To provide a high level of confidence the accuracy has to be high, which leads to the choice of rather large matching windows. Such relatively large matching windows, however, are incapable of catching small details due to their size.

Figure 3B:
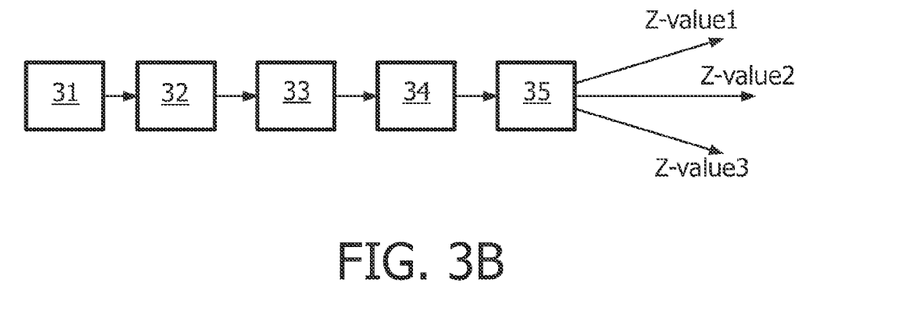
FIG. 3B illustrates a part of the method in accordance with the invention.

FIG. 3B illustrates a part of the method in accordance with the invention.

Rather than providing one disparity value for a point of interest a set of relatively small eccentric matching windows are used to provide for each point a number of candidate disparity values (z-value1, z-value2, z-value3 etc). No definitive decision is taken for any point; to each point more than one candidate disparity value is attributed. All the candidate disparity values combined provide for a noisy depth map.

Figure 4:
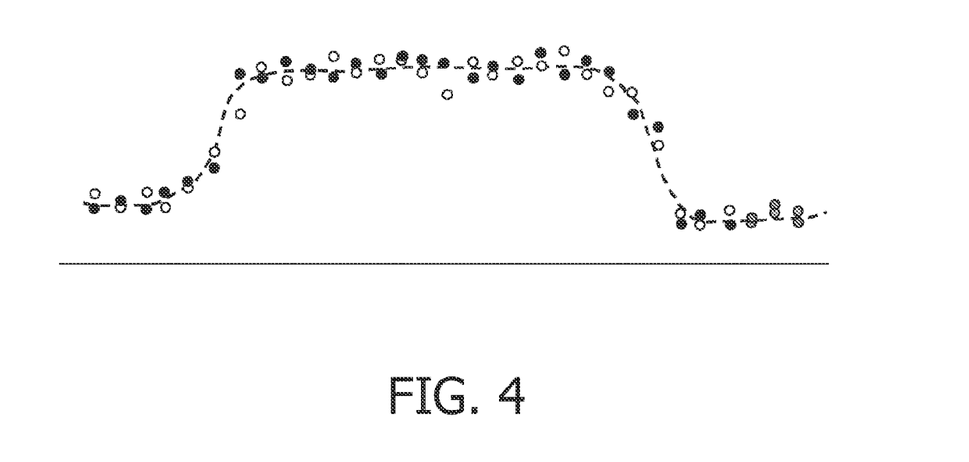
FIG. 4 illustrates, in one dimension, along a line the resulting provisional depth map.

FIG. 4 illustrates, in one dimension, wherein along a line the candidate disparity (i.e. the z-value) is shown, the resulting provisional depth map. In this example the disparity values for two different colors are calculated. The two different values are schematically indicated by the filled and open circles.

Figure 5:
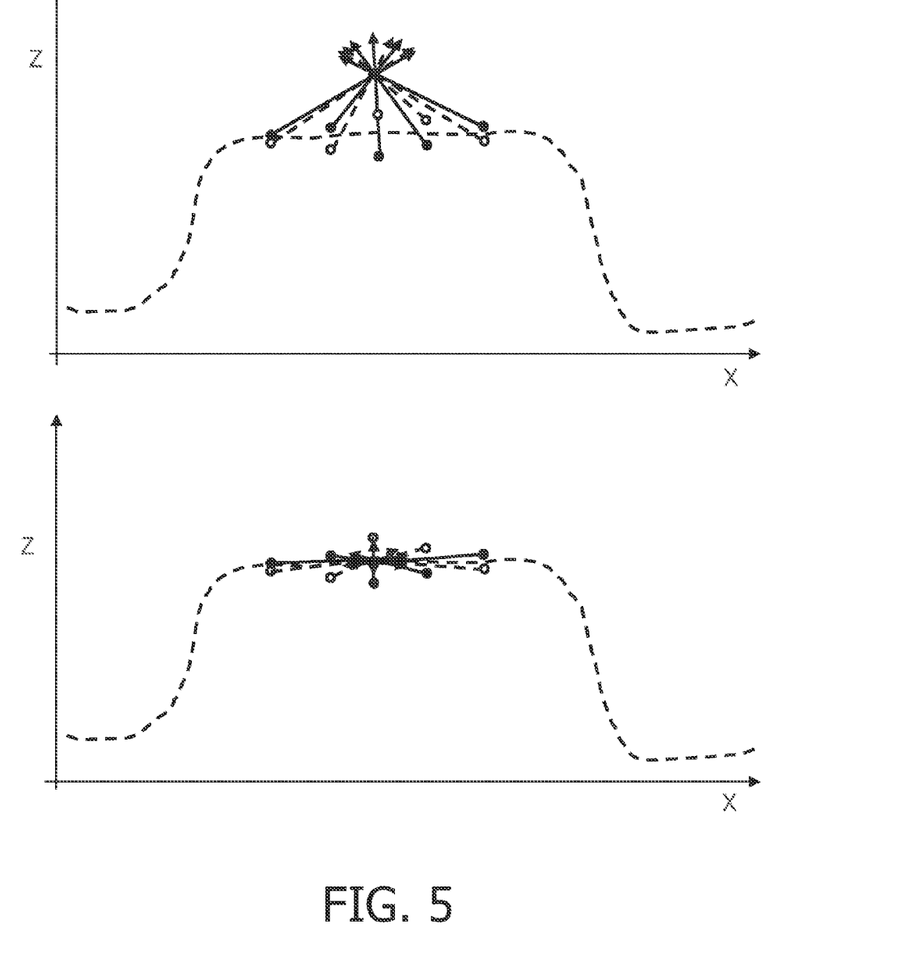
FIG. 5 illustrates a further step within the method of the invention.

FIG. 5 illustrates the next step within the method of the invention.

To estimate the actual depth, i.e. the actual disparity value for a point from noisy samples a scheme as shown in FIG. 5 is used. For each pixel the depth value that minimizes a norm of the sum of the unit vectors pointing from the reconstructed samples to the candidate point is calculated. In the case the depth value is far from the surface the norm of the sum of these vectors is large (a) but as we hit the surface it is expected to be at or near the minimum. Within the framework of this description this is also called a 'surface filter', i.e. a specific filtering is performed on the provisional noisy depth map. The provisional noisy depth map comprises for each point in the part of the image for which the method is used several candidate disparity values. The sum of the unit vectors is in itself a vector.

The norm of a vector can be mathematically understood as the "strength" of this vector. In the method of the invention the strength of this vector which is the sum of all these unit vectors is minimized. The surface map is reached if this strength is low. Now there are several ways of measuring the strength of a vector the most general is the Lp-norm, which is described in the following formula:

$$\|x\|_p = \left(\sum_n |x_n|^p\right)^{\frac{1}{p}}$$

Particular cases are

The $L2$ or Euclidean norm $(p = 2): \|x\|_2 = \left(\sum_n |x_n|^2\right)^{\frac{1}{2}}$ The $L1$ Norm $(p = 1)\|x\|_1 = \sum_n |x_n|$ And the limiting case called $L\infty$ which is defined as : $\|x\|_\infty = \max_n |x_n|$ Mathematically the L-1 norm of the sum of the unit vectors within a small neighborhood N around a site i is minimized with respect to the disparity $d_i$ (below the L-1 norm is given):

$$S(d_i) = \left|\sum_{P_j \in N} \frac{(P_i^x - P_j^x)}{((P_i^x - P_j^x)^2 + (P_i^y - P_j^y)^2 + (P^z(d_i) - P_j^z)^2)^{\frac{1}{2}}}\right| + \quad (1)$$

$$\left|\sum_{P_j \in N} \frac{(P_i^y - P_j^y)}{((P_i^x - P_j^x)^2 + (P_i^y - P_j^y)^2 + (P^z(d_i) - P_j^z)^2)^{\frac{1}{2}}}\right| +$$

$$\left|\sum_{P_j \in N} \frac{(P^z(d_i) - P_j^z)}{((P_i^x - P_j^x)^2 + (P_i^y - P_j^y)^2 + (P^z(d_i) - P_j^z)^2)^{\frac{1}{2}}}\right|$$

with $P_i=(P_i^x, P_i^y, P^z(d_i))$ the reconstructed point corresponding to the disparity value $d_i$ that is to be optimized (since we are on a regular grid only the z-component depends on $d_i$), and $P_j=(P_j^x, P_j^y, P_j^z)$ the reconstructed points corresponding to the disparity estimated by the different window configurations. The size of the neighborhood N can be kept small while surface extraction remains robust because of the redundancy coming from the different depth estimators (the different window matching configurations). If we are mostly interested in recovering fronto-parallel surfaces we can minimize only the z-component of (1) which is less expensive computationally.

The Neighborhood N can also be set by attributing weights to points, wherein the weight is a function of the distance between the points $$S(d_i) = \left| \sum_{P_j \in N} W(P_i) \frac{(P_i^x - P_j^x)}{((P_i^x - P_j^x)^2 + (P_i^y - P_j^y)^2 + (P^z(d_i) - P_j^z)^2)^{\frac{1}{2}}} \right| +$$

$$\left| \sum_{P_j \in N} W(P_i) \frac{(P_i^y - P_j^y)}{((P_i^x - P_j^x)^2 + (P_i^y - P_j^y)^2 + (P^z(d_i) - P_j^z)^2)^{\frac{1}{2}}} \right| +$$

$$\left| \sum_{P_j \in N} W(P_i) \frac{(P^z(d_i) - P_j^z)}{((P_i^x - P_j^x)^2 + (P_i^y - P_j^y)^2 + (P^z(d_i) - P_j^z)^2)^{\frac{1}{2}}} \right|$$

Where $W(P_j)$ is a function of the distance between points $P_j$ and the point P, decreasing in value as the distance increases.

The calculation is done for each point of the surface. How many points there are in the calculation will usually be equal to the number of pixels, i.e. to each pixel a point is attributed and for that point the z-value is calculated by minimizing the norm of the sum of unit vectors. This makes calculation relatively easy.

This will have a smoothing filtering effect on the disparity values. Since a range of points around the points of interest is used, this is called within the framework of the invention a surface filter.

For completeness the L-2 norm which could also be used is also given:

$$S_2(d_i) = \left| \sum_{P_j \in N} \frac{(P_i^x - P_j^x)}{((P_i^x - P_j^x)^2 + (P_i^y - P_j^y)^2 + (P^z(d_i) - P_j^z)^2)^{\frac{1}{2}}} \right|^2 +$$

$$\left| \sum_{P_j \in N} \frac{(P_i^y - P_j^y)}{((P_i^x - P_j^x)^2 + (P_i^y - P_j^y)^2 + (P^z(d_i) - P_j^z)^2)^{\frac{1}{2}}} \right|^2 +$$

$$\left| \sum_{P_j \in N} \frac{(P^z(d_i) - P_j^z)}{((P_i^x - P_j^x)^2 + (P_i^y - P_j^y)^2 + (P^z(d_i) - P_j^z)^2)^{\frac{1}{2}}} \right|^2$$

L-2 norm=$\{S_2(d_i)\}^{1/2}$

In a further embodiment an image constraint is used.

The surface filter can be shown to extract robustly disparities but to avoid the over-smoothing of depth discontinuities and for better recovery of small details we also include an image-matching constraint. For this term we can use any local image similarity criterion. For example we can employ SSD over a very small window. The final criterion that is minimized locally is:

$$E(i) = S(d_i) + \lambda \cdot SSD(d_i) \quad (2)$$

with $\lambda$ a factor that balances smooth disparity areas extraction with accurate boundary recovery. Optimization is performed by simply scanning between the minimum and maximum allowed discrete disparity values and finding the disparity that minimizes E(i).

In a sense this can be seen as a combined method minimizing a combination of the SSD for a point and the norm of the sum of the unit vectors from neighboring points. A norm of the sum of unit vectors is minimized but on the constraint that E(i) which is given by the norm of the sum plus the SSD at that point is minimized.

Figure 6:
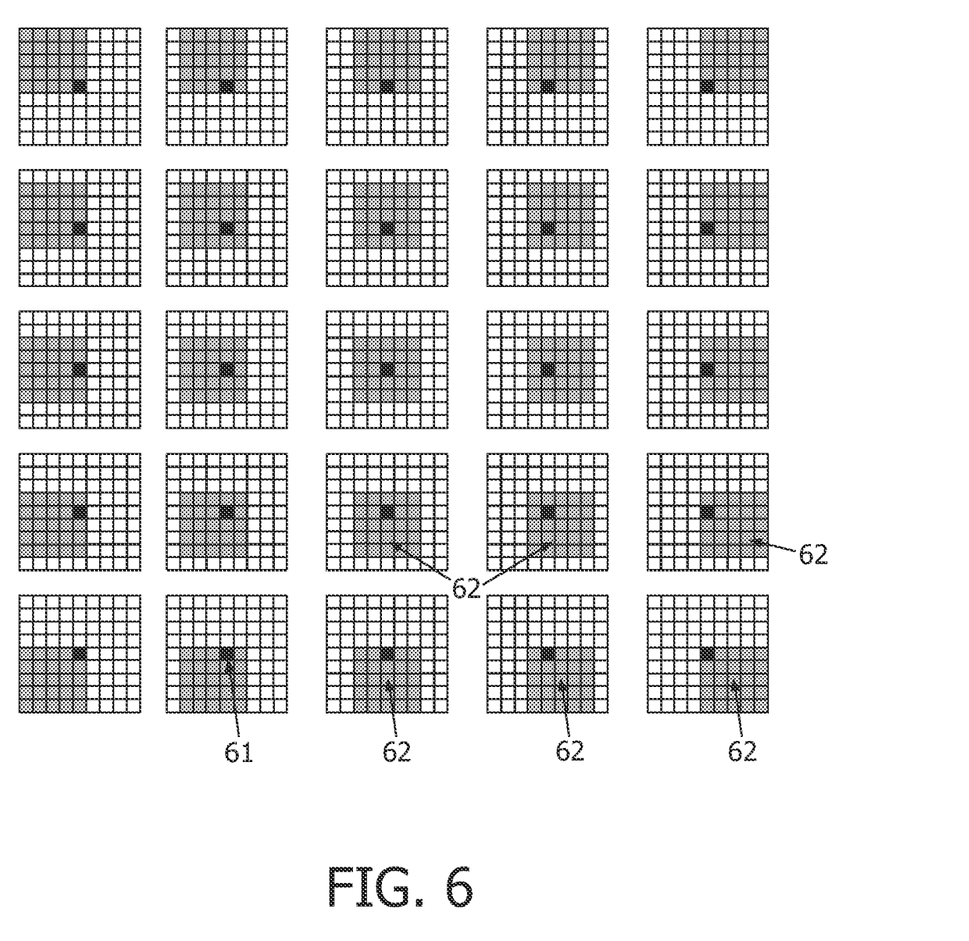
FIG. 6 illustrates a set of matching windows as described in the prior art.

FIG. 6 illustrates a set of matching windows as described in the cited prior art article. 25 windows are used, each window comprising 25 pixels. The pixel 61 for which the z-value is being determined, called "the point of interest" is represented by the black square. A standard matching window of 5*5 pixels is used and the pixel of interest is scanned over all point of the standard window. This provides 25 matching windows 62. In FIG. 4 these 25 matching windows are represented by the 5*5 areas of grey squares. Large amounts of calculations will have to be performed.

Figure 7:
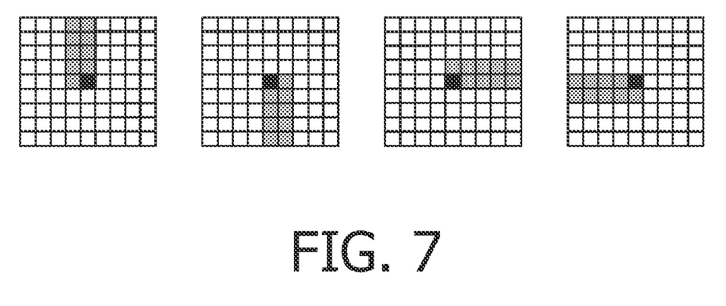
FIGS. 7 to 13 illustrate various embodiments of sets of matching windows useable for the method of the invention.

FIG. 7 illustrates a set of matching windows as used in the method and device of the invention.

In the example of FIG. 7 a set of four rectangular 5*2 matching windows, substantially orthogonally oriented, is used. The overlap between the matching windows is small.

Figure 8:
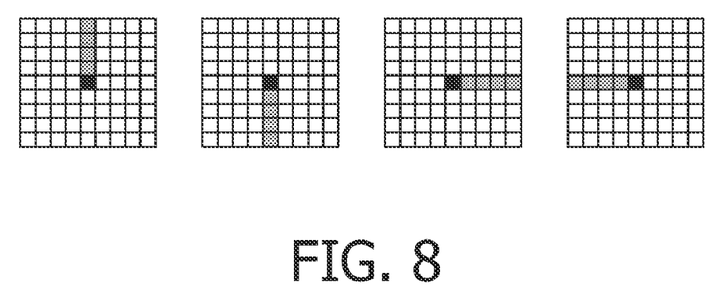

FIG. 8 illustrates a further example of a set of windows.

Figure 9:
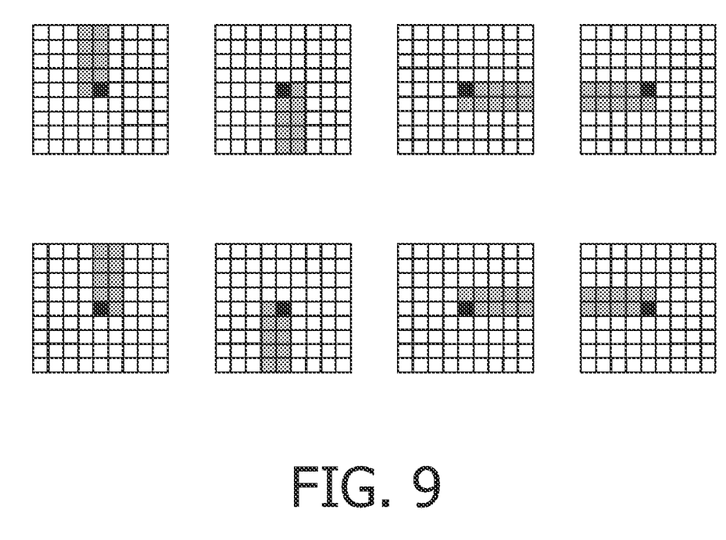

FIG. 9 illustrates yet another example of a set of windows used in a method and device in accordance with the invention. In this case two sets of four matching windows are used.

Figure 10:
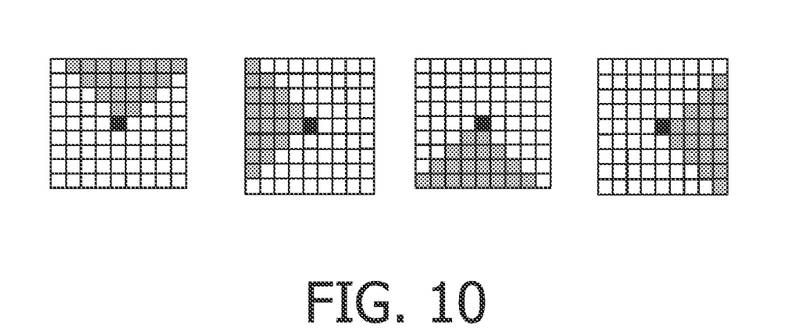

FIG. 10 illustrates yet another example of a set of windows used in a method and device in accordance with the invention.

Figure 11:
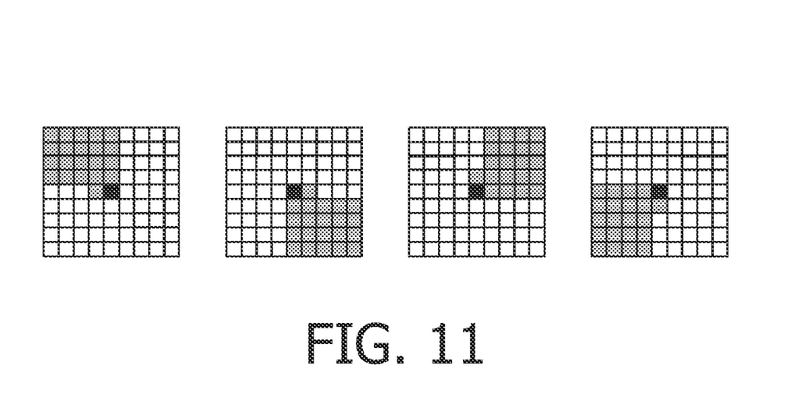

FIG. 11 illustrates yet a further example.

Figure 12:
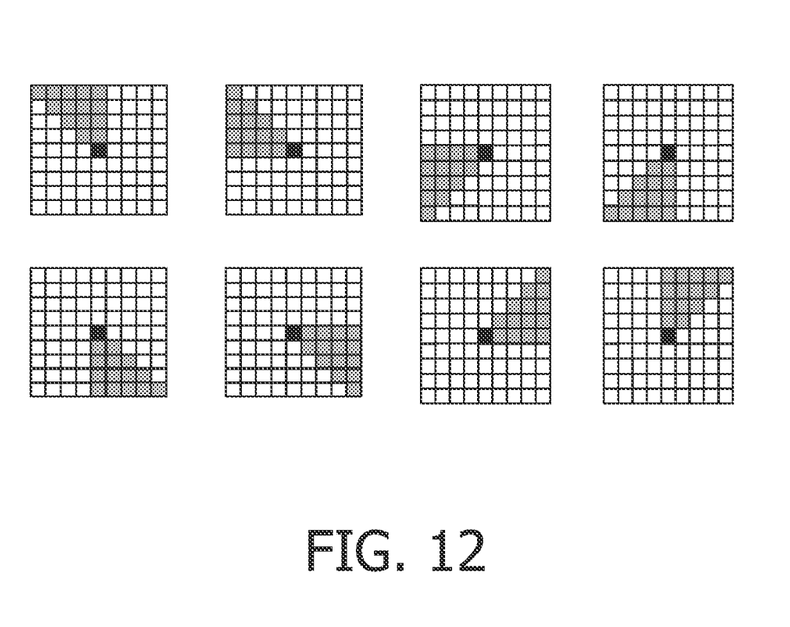
Figure 13:
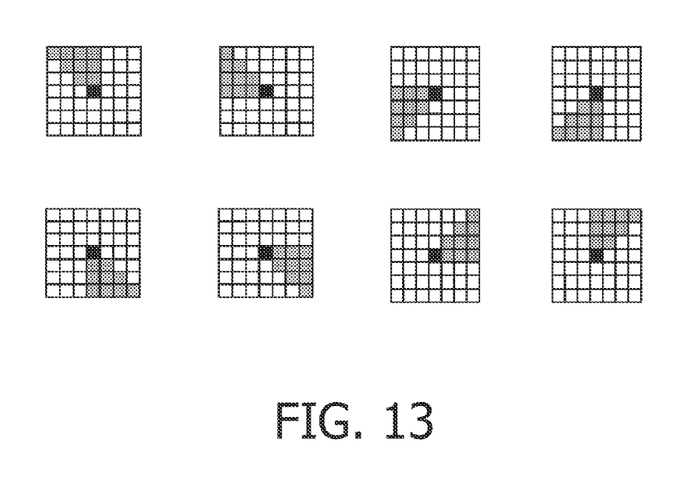

FIGS. 12 and 13 illustrate yet a further embodiment of the invention. In the latter examples a set of 8 triangular windows is used.

It is remarked that none of the shown examples of matching windows is square. Preferably the matching windows are non-square, since non-square shaped windows such as rectangular or triangular matching windows are more suitable for locking on particular image features such us horizontal and vertical edges (for rectangular matching windows or triangular as shown in FIG. 11) or edges at 45 degrees (for the triangular matching windows).

The examples shown in FIGS. 7, 8 and 9 show matching windows of substantially rectangular shape. The windows are oriented orthogonal to each other and form, in combination, a cross-shape. These matching windows, as do the matching windows shown in FIG. 9, show edges along the vertical and horizontal direction. Such rectangular shaped matching windows, oriented along the vertical and horizontal direction, are most preferred.

Preferably the matching windows have the same shape and form foursomes of shapes, wherein the shape is oriented and wherein the shapes of each matching window is related to the shape of another matching window and may be obtained by a 90, 180 or 270 degree rotation of another one of the matching windows. The sets of FIGS. 7 to 13 show such arrangements, wherein each set of matching windows is derived from one (FIGS. 7, 8, 9 and 10) or two (FIGS. 9, 12) basic oriented forms which are rotated by 90, 180 and 270 degrees to provide the other forms. Such arrangement provides for easy calculations. Preferably a balance is stricken by employing small relatively thin matching windows that are mutually oriented in orthogonal directions to generate disparity candidates.

This scheme provides, on the basis of the provisional depth map a further depth map.

The calculation may be further optimized by a number of preferred refinements:

In the calculation of S(D) a check is performed to delete from the calculation of S(D) those unit vectors that differ more than a threshold value from the average. Aberrant candidate disparity values, i.e. candidate disparity values due to some computational error, are then less likely to negatively influence the outcome. The threshold values may be a fixed value or be calculated on the basis of the other values or may be related to a spread calculation.

Different schemes are possible to reject false matches and to detect occluded regions. A simple scheme is a straightforward Left-Right/Right-Left consistency check. This will insure the uniqueness of the obtained correspondences and allows the labeling of occlusion areas.

Image-Based Post-processing

Outlier rejection and occlusion detection will produce holes in the further depth map, i.e. areas for which there is no disparity value. To fill the holes resulting from the outlier rejection and occlusion detection steps we use a color-based averaging. This consists of computing the average (within a local neighborhood) of the disparities that correspond to color pixels close to the color at our site ($R_i$, $G_i$, $B_i$). A non-linear filter can be used to re-compute the depth at a site i at a hole as follows:

$$\hat{d}_i = \frac{\sum_j w_{ij} d_j}{\sum_j w_{ij}}$$

$$w_{ij} = 1 \text{ if } \Delta C = |R_i - R_j| + |G_i - G_j| + |B_i - B_j| < T_c$$

$$w_{ij} = 0 \text{ else}$$

with $T_C$ being the color difference threshold.

$$\text{For} \sum_j w_{ij} = 0 \text{ the old depth value is kept.}$$

This filter can be used iteratively and has the advantage of re-aligning the boundaries of the depth maps with those of the corresponding color image, which is very important for 3D rendering applications. The choice of including a color difference threshold is dictated by the desire to have sharp depth discontinuities that match the actual image discontinuities. In practice this choice has proven to work well.

Figure 14:
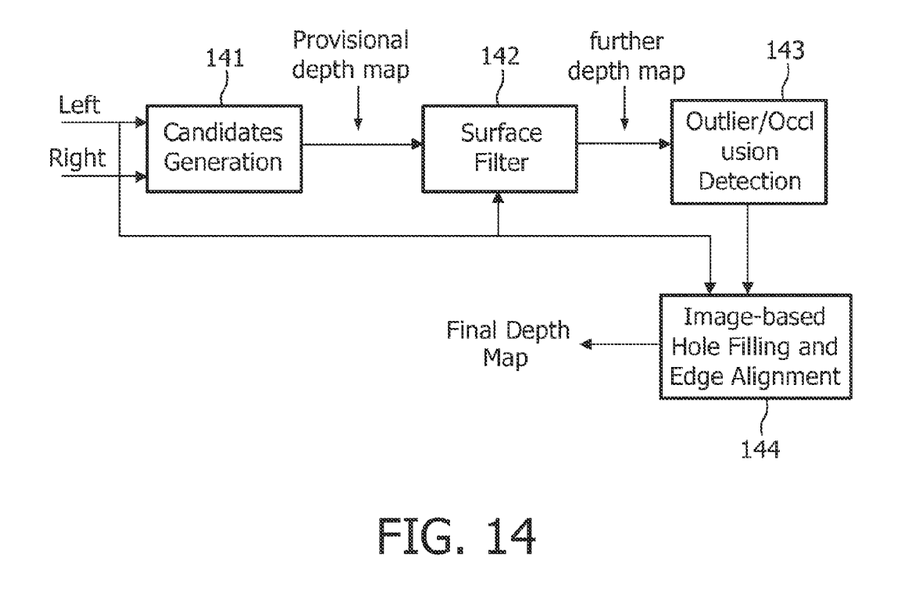
FIG. 14 illustrates a method in accordance with the invention

FIG. 14 illustrates a method in accordance with the invention in more detail.

FIG. 14 illustrates 4 modules 141 to 144; the first two modules 141 and 142 are part of the method of the invention in its broadest scope. The later two modules 143 and 144 are part of preferred embodiments and are optional.

To the first module 141 data of the left and right image data are provided, or in case images are taken from more than two view points, the image data from the various viewpoints. In this module a provisional depth map is generated using a window based matching. This provisional depth map, comprising more than one candidate disparity value for each point, is sent to a surface filter module 142. The surface filter module applies a surface filter to the provisional depth map by minimizing at least the z-component of the norm of a sum of unit vectors pointing from the candidate disparity values for neighboring points to said point. This provided for a further depth map. Additional modules 143 and 144, which are optional, provide for outlier/occlusion detection and subsequent hole filing. The end product is a final depth map.

A device in accordance with the invention comprises an input for inputting image data obtained from different orientations and a determinator (142) for determining a provisional depth map from the image data received by the input using window-based matching for a point of the image, wherein in the determinator a set of matching windows is used for the point of the image to generate candidate disparity values for the points, wherein the matching windows of the set are eccentrically positioned in respect of the points, wherein device further comprises a surface filter (142) arranged for providing a further depth map on the basis of the provisional depth map by minimizing for each point at least the z-component of the norm of a sum of unit vectors pointing from the candidate disparity values for neighboring points to said point.

Figure 15:
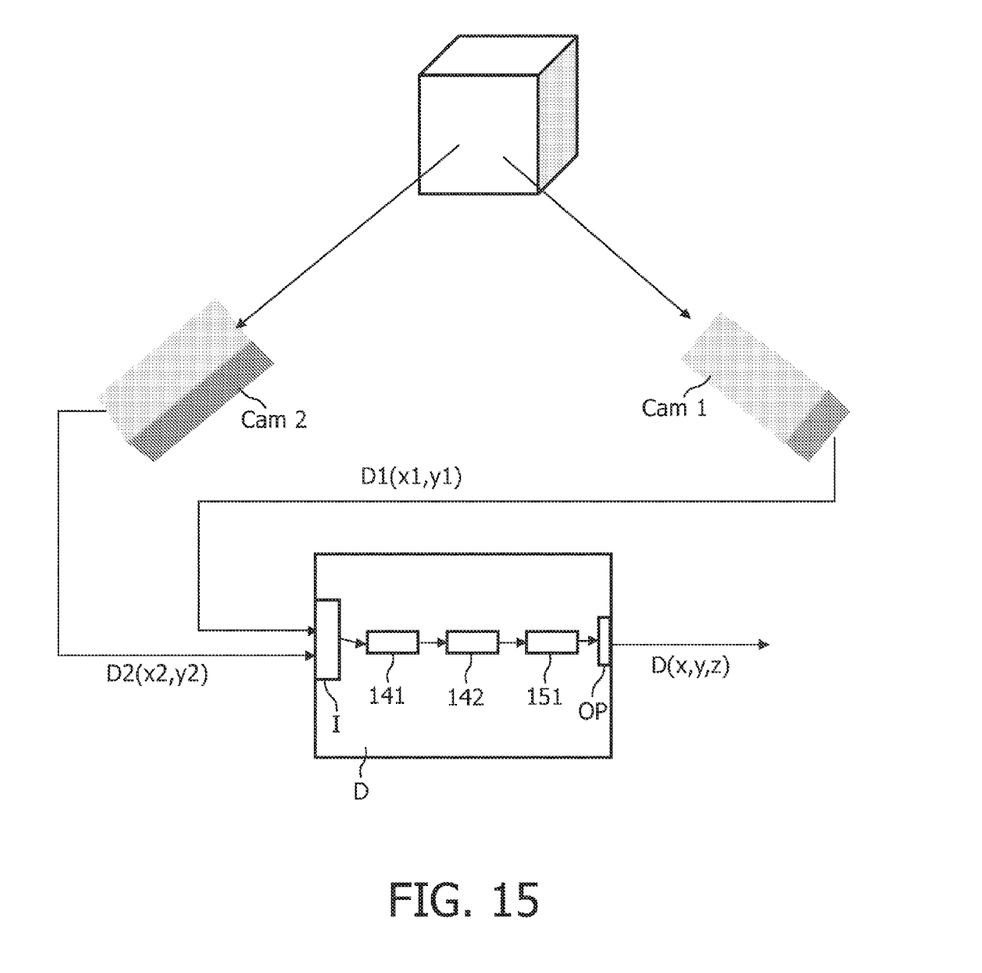
FIGS. 15 and 16 illustrate devices in accordance with the invention.

FIG. 15 illustrates a device in accordance with the invention. Of an object, represented in FIG. 15 by a cube, images are taken by two cameras. In this example two cameras are shown, but the device may comprise more than two cameras. The cameras may record color images, or monochrome images or X-ray images or infrared images. Each of the camera provide two sets of data, wherein each set of data represents a two dimensional image, in the Figure illustrated by D1(x1,y1) and D2(x2,y2), i.e. two two-dimensional data sets. The cameras take the images form different orientations. The device comprises an input I for inputting the images taken from different orientations and a determinator 141. Within the determinator the images are matched using a matching window approach in accordance with the invention. The determinator provides for a provisional depth map which is sent to a surface filter 142. The surface filter 142 provides for a further depth map. This further depth map may be further improved by outlier rejection/occlusion detection and image based hole filling.

In attributor 151 to said pixel a z-value is attributed using the further or final depth map. Preferably the data from the cameras comprises data on the mutual orientation of the camera's, the determinator has means to determine the mutual orientation of the camera's or the camera's comprise means to communicate such mutual orientation to the determinator, or the determinator comprises means for inputting such data (for instance by hand), or the set-up of the camera's is fixed so that the mutual orientation is known. Taking of images by the cameras is preferably synchronized. The device has an output OP. The output data stream D(x,y,z) is a data stream that comprises both the x and the y coordinate of points, as well as the z-coordinate, i.e. the depth map. This output data stream D(x,y,z) may be sent to a recording device for instance to record the data stream on a DVD data carrier or any other data carrier, or the output data stream D(x,y,z) may be sent to a three-dimensional display device for displaying three dimensional images.

FIG. 15 illustrates a device comprising recording devices such as cameras.

Figure 16:
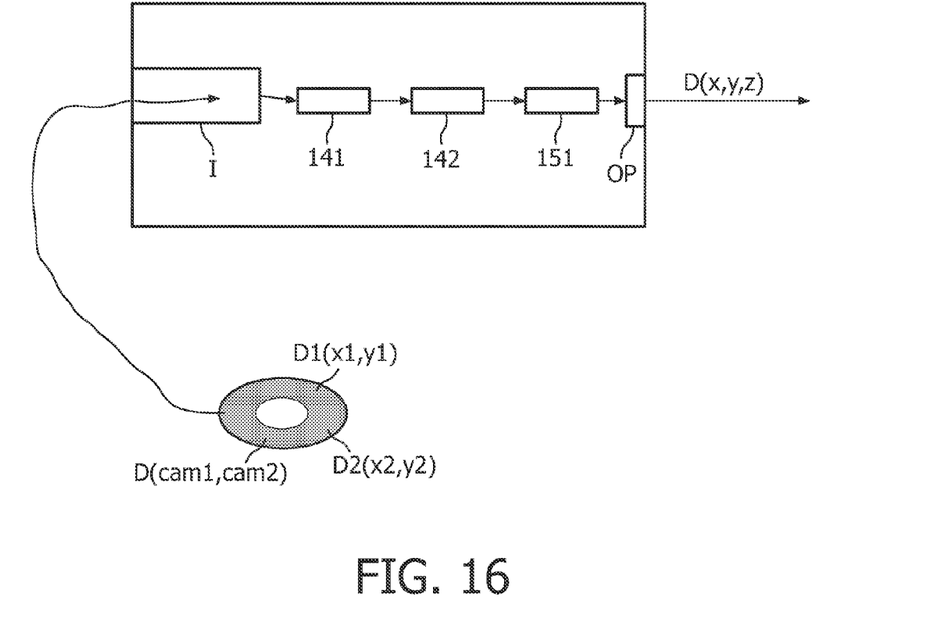

FIG. 16 illustrates a device which has an input for a data carrier, such as for instance a DVD, upon which the data D1(x1,y1) and D2(x2,y2) as well as data on the mutual orientation of the camera's (D(cam1, cam2) are stored. The device in accordance with the invention reads the data and provides an output data stream D(x,y,z).

Preferred embodiments of a device in accordance with the invention comprise means for determining the depth map in accordance with any one or any combination of the above mentioned preferred embodiments of the method, for instance that the matching windows or non-square.

A device in accordance with the invention may comprise means for recording images, i.e. the device may include the cameras for taking the images, wherein the cameras send the data on the image to the mentioned input. The device may also receive data from recording devices.

It is remarked that, within the concept of the present invention "determinator", filter etc. is to be broadly understood and to comprise e.g. any piece of hardware (such as a determinator), any circuit or sub-circuit designed for performing a determination, selection or matching function as described as well as any piece of soft ware (computer program or sub program or set of computer programs, or program code(s)) designed or programmed to perform a determination, selection or matching operation in accordance with the invention as well as any combination of pieces of hardware and software acting as such, alone or in combination, without being restricted to the below given exemplary embodiments. One program may combine several functions.

Figure 17:
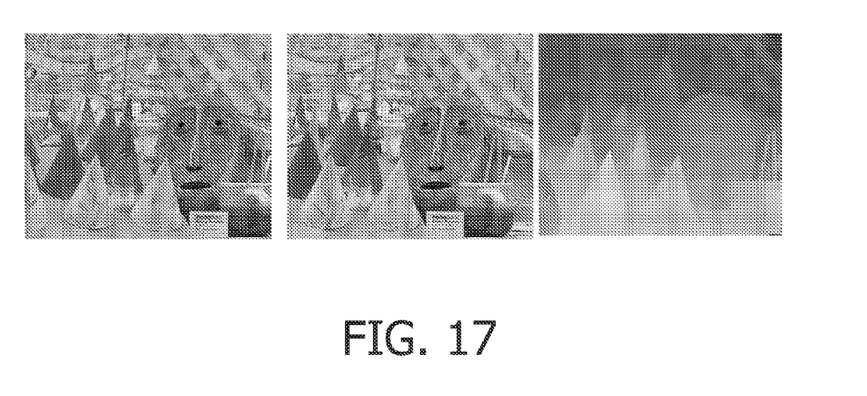
FIG. 17 illustrates results of the method in accordance with the invention.

FIG. 17 illustrate results of the method in accordance with the invention.

For performance evaluation we run our algorithm on a still pair (FIG. 17). The first two images are left and right images, the last Figure gives an idea of the depth map, wherein the grey value is an indication of the depth. The results show a very good performance in both extracting depth within low-textured areas and high accuracy at the depth discontinuities. The robust recovery of depth within low-textured area is permitted by the use of the robust surface filter and the redundancy coming from the multiple candidates, also the use of an implicit model of the surface was an important factor. Outlier rejection by checking the consistency also performs well given the robustness of the depth estimates from left to right and from right to left, and mostly occluded or virtually non-textured areas are detected. Finally the image-based post-processing step although very simple allows for both a proper gap filing and boundary realignment. Tests on image sequences showed that the algorithm in accordance with the invention provided both high quality depth and good time consistency, while for such sequences the leading optimization-driven techniques proved less stable given that convergence is local and hence initialization becomes crucial. Another advantage of the invention is the modular nature of the system allowing for flexible implementation and permitting optimization compromises that will lead to real-time performance.

FIGS. 18A to 18D further illustrate the invention.

Figure 18A:
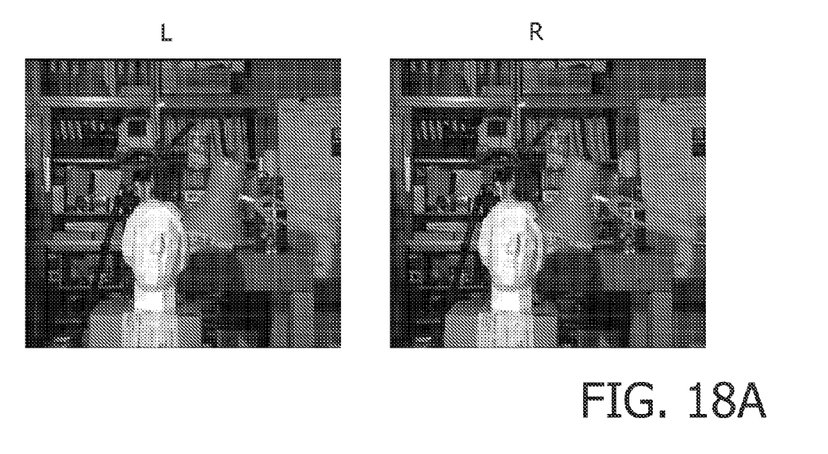
FIGS. 18A to 18D further illustrate results of the method in accordance with the invention.
Figure 18B:
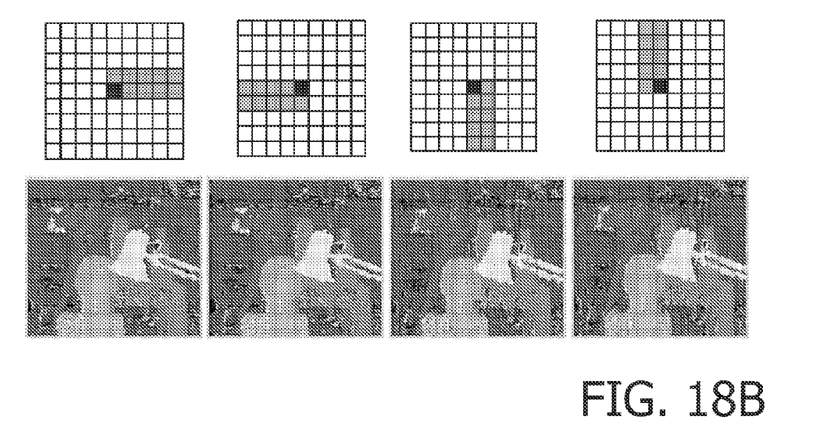
Figure 18C:
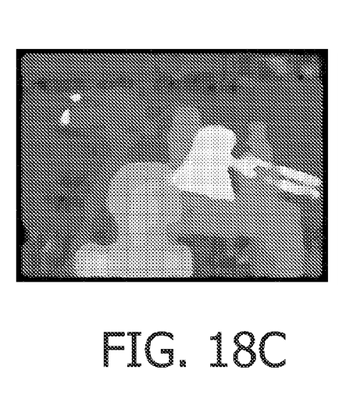
Figure 18D:
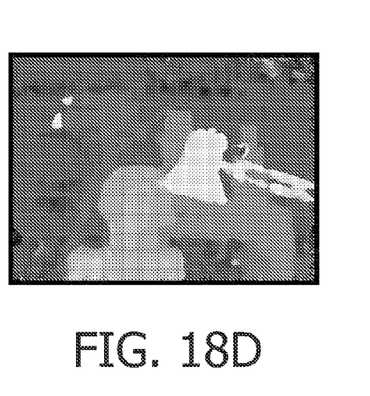

In FIG. 18B are shown the results of stereo matching of the left (L)-right (R) image pair of FIG. 18A using the four different small thin windows (left ones with the horizontal windows and right ones with the vertical windows) as shown in FIG. 7, the provisional depth maps obtained are very noisy as expected. The result of median filtering is shown in 18C and compared to that of the surface filter of the invention in FIG. 18D. FIG. 18D thus illustrates a further depth map made by a method in accordance with the invention. It is clear that the median filter will over-smooth the depth map leading to a loss of fine details. For instance on the lamp more details are visible in FIG. 18D than there are in FIG. 18C. The surface filter on the other hand thus recovers more information from the original depth maps while removing noise. The final results after the image-based post-processing improved for the median filter and as for the surface filter. When the further and final depth maps are compared to ground truth the surface filter has 15% less "bad pixels" than the median filter.

In short the invention may be described as follows:

Window based matching is used to determine a depth map from images obtained from different orientations. A set of matching windows is used for points of the image for which the depth is to be determined. A provisional depth map is generated wherein to each point more than one candidate disparity value is attributed. The provisional depth map is filtered using a surface filter wherein at least the z-component of a norm of a sum of unit vectors pointing from the candidate disparity values for neighboring points to a point of interest.

The invention is also embodied in any computer program product for a method or device in accordance with the invention. Under computer program product should be understood any physical realization of a collection of commands enabling a processor—generic or special purpose—, after a series of loading steps (which may include intermediate conversion steps, like translation to an intermediate language, and a final processor language) to get the commands into the processor, to execute any of the characteristic functions of an invention. In particular, the computer program product may be realized as data on a carrier such as e.g. a disk or tape, data present in a memory, data traveling over a network connection—wired or wireless—, or program code on paper. Apart from program code, characteristic data required for the program may also be embodied as a computer program product.

Some of the steps required for the working of the method may be already present in the functionality of the processor instead of described in the computer program product, such as data input and output steps.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

It will be clear that within the framework of the invention many variations are possible. It will be appreciated by persons skilled in the art that the present invention is not limited by what has been particularly shown and described hereinabove. The invention resides in each and every novel characteristic feature and each and every combination of characteristic features. Reference numerals in the claims do not limit their protective scope.

For instance, the method may de used for only a part of the image, or different embodiments of the method of the invention may be used for different parts of the image, for instance using one embodiment for the center of the image, while using another for the edges of the image.

Also in the examples a unit vectors in three dimensions is used, i.e. a unit vectors having three coordinates, the x, y and z coordinate. More dimensional vectors may be used:

An example is the use of a six-dimensional vector that will include the spatial coordinates: $(P^x, P^y, P^z)$ and associated red, green and blue color values: $(P^r, P^g, P^b)$ resulting in the augmented vector $(P^x, P^y, P^z, P^r, P^g, P^b)$. Using this case we can now generalize the criteria for the L-1 norm as follows:

$$S(d_i) = \left| \sum_{P_j \in N} \frac{(P_i^x - P_j^x)}{((P_i^x - P_j^x)^2 + (P_i^y - P_j^y)^2 + (P^z(d_i) - P_j^z)^2) + (P^r - P_j^r)^2 + (P^g - P_j^g)^2 + (P^b - P_j^b)^2)^{\frac{1}{2}}} \right| +$$

$$\left| \sum_{P_j \in N} \frac{(P_i^y - P_j^y)}{((P_i^x - P_j^x)^2 + (P_i^y - P_j^y)^2 + (P^z(d_i) - P_j^z)^2 + \frac{1}{2}} (P^r - P_j^r)^2 + (P^g - P_j^g)^2 + (P^b - P_j^b)^2)^{\frac{1}{2}}} \right| +$$

$$\left| \sum_{P_j \in N} \frac{(P^z(d_i) - P_j^z)}{((P_i^x - P_j^x)^2 + (P_i^y - P_j^y)^2 + (P^z(d_i) - P_j^z)^2) + (P^r - P_j^r)^2 + (P^g - P_j^g)^2 + (P^b - P_j^b)^2)^{\frac{1}{2}}} \right| +$$

$$\left| \sum_{P_j \in N} \frac{(P^r(d_i) - P_j^r)}{((P_i^x - P_j^x)^2 + (P_i^y - P_j^y)^2 + (P^z(d_i) - P_j^z)^2) + (P^r - P_j^r)^2 + (P^g - P_j^g)^2 + (P^b - P_j^b)^2)^{\frac{1}{2}}} \right| +$$

-continued $$\left| \sum_{P_j \in N} \frac{(P^g(d_i) - P_j^g)}{((P_i^x - P_j^x)^2 + (P_i^y - P_j^y)^2 + (P^z(d_i) - P_j^z)^2) + (P^r - P_j^r)^2 + (P^g - P_j^g)^2 + (P^b - P_j^b)^2)^{\frac{1}{2}}} \right| +$$

$$\left| \sum_{P_j \in N} \frac{(P^b(d_i) - P_j^b)}{((P_i^x - P_j^x)^2 + (P_i^y - P_j^y)^2 + (P^z(d_i) - P_j^z)^2) + (P^r - P_j^r)^2 + (P^g - P_j^g)^2 + (P^b - P_j^b)^2)^{\frac{1}{2}}} \right|$$

Also when weights are attributed to a unit vector this could be a function of the distance between the disparity candidate and the point of interest, but there could also be a weight attributed depending on the matching window used. If a set of matching windows is used which are basically uniform, though differing in orientation, as given in the shown examples, it is very likely that all estimates are of equal weight. However, the set of matching windows could have matching windows fundamentally differing in size or form. An example would be to use a compounded set of matching windows of compounded of the type shown in FIG. 7 and the type as shown in FIG. 10. To each point 8 candidate disparity values would then be attributed, 4 for each subset. The weight of candidate disparity values may be the same within a subset, but differ between the subsets. This confidence weight may be a fixed number given by the user depending on his experience with the different estimators.

Use of the verb "to comprise" and its conjugations does not exclude the presence of elements other than those stated in the claims. Use of the article "a" or "an" preceding an element does not exclude the presence of a plurality of such elements.

The invention claimed is:

1. Method for determining a depth map from images obtained from different orientations using window-based matching for a point of the image, wherein at least for a part of the image, for the points of the part of the image, a set of matching windows is used, a number of candidate disparity values is calculated for each point to provide for a provisional depth map wherein to each point more than one candidate disparity value is attributed, whereafter a further depth map is calculated by minimizing for each point at least the z-component of a norm of a sum of unit vectors pointing from the candidate disparity values for neighboring points to said point.

2. Method as claimed in claim 1, wherein all components of a norm of a sum of the unit vectors of neighboring points are minimized.

3. Method as claimed in claim 1 wherein the set of matching comprises one or more matching windows for which the point of interest is eccentrically located in respect of the matching window.

4. Method as claimed in claim 1, wherein the sum of the unit vectors is a weighted sum, wherein the weight for each unit vectors within the calculation is a function of distance to the point of interest.

5. Method as claimed in claim 1, wherein a check is performed to delete from the calculation unit vectors, which differ more than a threshold value from the average.

6. Method as claimed in claim 1 wherein the set of matching windows is a substantially orthogonal set of matching windows.

7. Method as claimed in claim 6, wherein the number of matching windows is four and the matching windows form a cross.

8. Method as claimed in claim 7, wherein the number of matching windows is eight, wherein the windows are comprised of two foursomes, one foursome being the left hand or right hand version of the windows in the other foursome, each forming a cross.

9. Method as claimed in claim 6, wherein the matching windows are substantially triangular.

10. Method as claimed in claim 1 wherein outlier rejection/occlusion detection is performed on the further depth map.

11. Method as claimed in claim 10 wherein image based hole filing is performed on the further depth map.

12. Computer program product comprising program code means stored on a non-transitory computer readable medium for performing a method as claimed in claim 1.

13. A device comprising an input for inputting image data obtained from different orientations and a determinator (141) for determining a provisional depth map from the image data received by the input using window-based matching for a point of the image, wherein in the determinator a set of matching windows is used for the point of the image to generate candidate disparity values for the points, wherein the device further comprises a surface filter (142) arranged for providing a further depth map on the basis of the provisional depth map by minimizing for each point at least the z-component of a norm of a sum of unit vectors pointing from the candidate disparity values for neighboring points to said point.

14. A device as claimed in claim 13 wherein the surface filter is arranged to minimize all components of a norm of a sum of the unit vectors of neighboring points.

15. A device as claimed in claim 13 wherein the determinator is arranged such that the set of matching comprises one or more matching windows for which the point of interest is eccentrically located in respect of the matching window.

16. A device as claimed in claim 13 wherein the surface filter is arranged such that the sum of the unit vectors is a weighted sum, wherein the weight for each unit vectors within the calculation is a function of distance to the point of interest.

17. A device as claimed in claim 13 wherein the surface filter is arranged such that a check is performed to delete from the calculation that unit vectors that differ more than a threshold value from the average.

18. A device as claimed in claim 13, wherein the device comprises means for recording images.

* * * * *